(12) United States Patent
Dayley

(10) Patent No.: US 8,688,773 B2
(45) Date of Patent: Apr. 1, 2014

(54) SYSTEM AND METHOD FOR DYNAMICALLY ENABLING AN APPLICATION FOR BUSINESS CONTINUITY

(75) Inventor: Brad William Dayley, Spanish Fork, UT (US)

(73) Assignee: EMC Corporation, Hopkinton, MA (US)

( * ) Notice: Subject to any disclaimer, the term of this patent is extended or adjusted under 35 U.S.C. 154(b) by 954 days.

(21) Appl. No.: 12/193,520

(22) Filed: Aug. 18, 2008

(65) Prior Publication Data

US 2010/0042673 A1 Feb. 18, 2010

(51) Int. Cl.
*G06F 15/16* (2006.01)

(52) U.S. Cl.
USPC .......................................................... 709/203

(58) Field of Classification Search
USPC .......................................................... 709/203
See application file for complete search history.

(56) References Cited

U.S. PATENT DOCUMENTS

| | | | |
|---|---|---|---|
| 6,697,960 B1 | 2/2004 | Clark et al. | |
| 7,234,072 B2 | 6/2007 | Exfahany | |
| 7,234,075 B2 | 6/2007 | Sankaran et al. | |
| 7,266,607 B2 | 9/2007 | Andreev et al. | |
| 7,941,507 B1 * | 5/2011 | Murphy et al. | 709/220 |
| 2004/0064436 A1 | 4/2004 | Breslin et al. | |
| 2005/0144062 A1 * | 6/2005 | Mittal et al. | 705/10 |
| 2007/0208799 A1 | 9/2007 | Hughes | |
| 2008/0010481 A1 * | 1/2008 | Anantharamaiah et al. | 714/2 |

* cited by examiner

*Primary Examiner* — Tarcza H. Thomas
*Assistant Examiner* — Maceeh Anwari
(74) *Attorney, Agent, or Firm* — Barry N. Young

(57) ABSTRACT

System and method for dynamically enabling an application for business continuity are described. In one embodiment, a business continuity engine ("BCE") for managing and controlling a high-availability applications comprises a configuration management module for maintaining information regarding the current configuration of a BC application; a status monitor for monitoring a status of the BC application via a high-availability ("HA") wrapper thereof and initiating a migration of the BC application from a first server of a primary cluster to a second location of a secondary cluster based on the determined status; and an application migration module for migrating the BC application to the second server responsive to the initiating. The BCE further comprises a storage area network ("SAN") migration module for enabling storage media for use by the BC application; and a communications module for facilitating an exchange of data between the BC engine and the BC application.

20 Claims, 2 Drawing Sheets

SYSTEM AND METHOD FOR DYNAMICALLY ENABLING AN APPLICATION FOR BUSINESS CONTINUITY

BACKGROUND

The current economic and business environment dictates that organizations must have in place a strong Business Continuity Plan ("BCP") to ensure that, in the event of a man-made or natural disaster, the operations and activities of the organization can continue with little to no interruption. In general, a well-designed BCP specifies how an organization will recover and restore partially or completely interrupted critical functions within a predetermined time after a disruption.

Business Continuity Clustering ("BCC") ensures that in the event of an isolated server problem or even a severe calamity, an organization's systems function normally and without noticeable service interruption. BCC connects and synchronizes independent, often geographically dispersed, clusters of servers, or nodes. If a data center's cluster fails for any reason, the other clusters assume the workload thereof to ensure non-stop access to mission-critical data and resources. In short, BCC provides synchronization among geographically dispersed clusters; however, BCC does not provide managerial functions for individual resources per se. In other words, in BCC, when a primary cluster fails, the entire operations of the primary cluster are moved to one or more secondary clusters without regard to the particular resources being employed.

SUMMARY

One embodiment is a business continuity engine ("BCE") for managing and controlling a high-availability applications. The BCE comprises a configuration management module for maintaining information regarding the current configuration of a BC application; a status monitor for monitoring a status of the BC application via a high-availability ("HA") wrapper thereof and initiating a migration of the BC application from a first server of a primary cluster to a second location of a secondary cluster based on the determined status; and an application migration module for migrating the BC application to the second server responsive to the initiating. The BCE further comprises a storage area network ("SAN") migration module for enabling storage media for use by the BC application; and a communications module for facilitating an exchange of data between the BC engine and the BC application.

DETAILED DESCRIPTION

Figure 1:
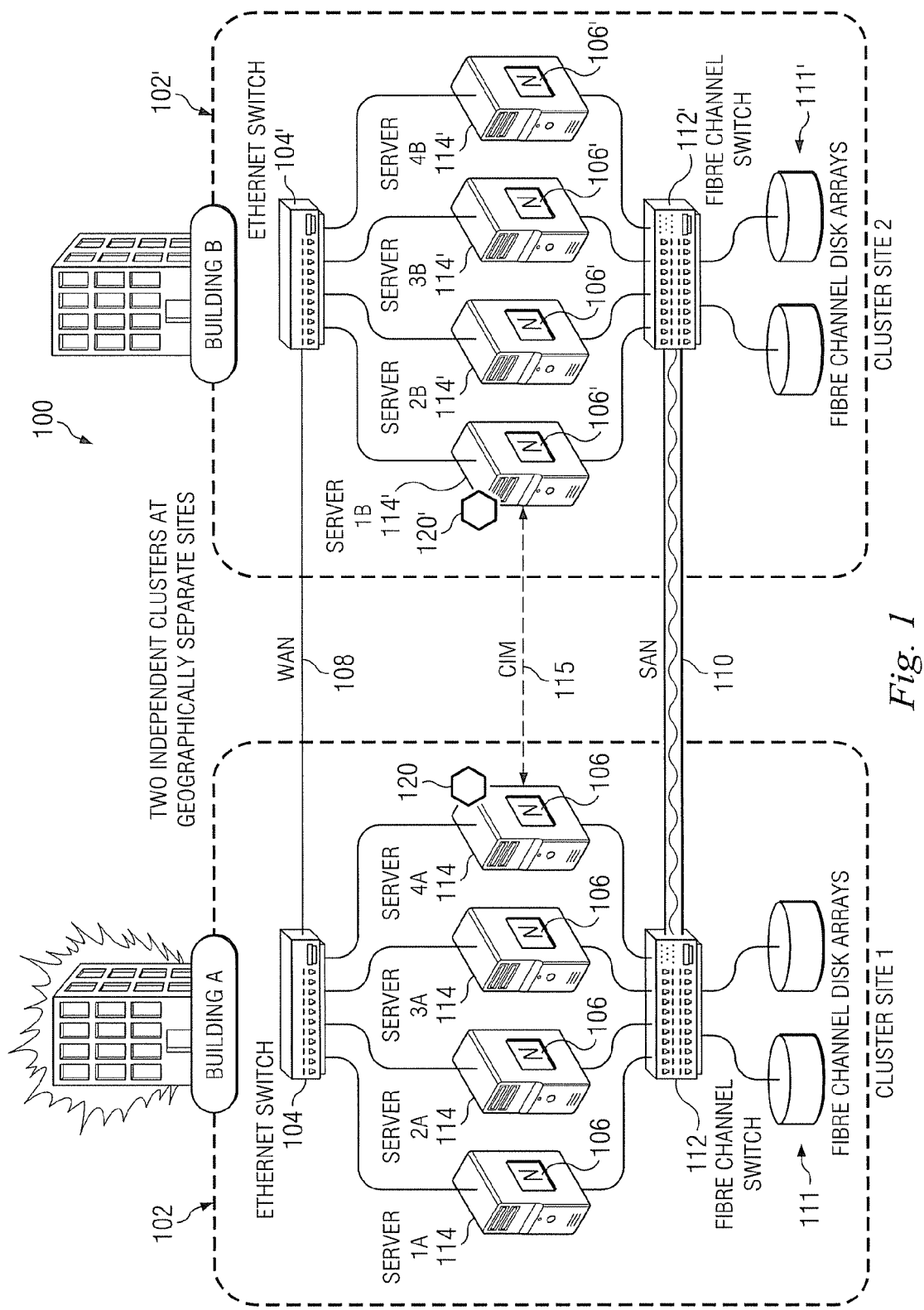
FIG. 1 illustrates a business continuity cluster system for implementing an embodiment for dynamically enabling an application for business continuity.

To better illustrate the advantages and features of the embodiments, a particular description of several embodiments will be provided with reference to the attached drawings. These drawings, and other embodiments described herein, only illustrate selected aspects of the embodiments and are not intended to limit the scope thereof. Further, despite reference to specific features illustrated in the example embodiments, it will nevertheless be understood that these features are not essential to all embodiments and no limitation of the scope thereof is thereby intended. Any alterations and further modifications in the described embodiments, and any further applications of the principles of the embodiments as described herein are contemplated as would normally occur to one skilled in the art. Furthermore, some items are shown in a simplified form, and inherently include components that are well known in the art. Further still, some items are illustrated as being in direct connection for the sake of simplicity and clarity. Despite the apparent direct connection, it is understood that such illustration does not preclude the existence of intermediate components not otherwise illustrated.

In one embodiment, system and method are provided to enable a high-availability ("HA") application for business continuity. In particular, a configuration, management, and monitoring service is provided for configuring an application to be monitored and, in the event of primary cluster failure, automatically migrate the application to a secondary cluster. As used herein, the following terms have the following meanings:

| | |
|---|---|
| application | a software application for execution on a computer |
| HA wrapper | a software interface that exposes a set of high availability APIs to an application |
| BC application | an application having an HA wrapper |
| online | the process of loading an application on a server in a cluster |
| offline | the process of unloading an application from a server in a cluster |
| migration | the process of moving an application from a server in a primary cluster to a server in a secondary cluster |
| failover | an automated process of migrating an application in the event of primary cluster failure |

One embodiment comprises a set of application programming interfaces ("APIs") exposed to an application via an HA wrapper, which APIs can be employed by the application to directly access a business continuity engine ("BCE"), as described below. Application vendors may employ the HA wrapper APIs to enable an application as a Business Continuity ("BC") application. As will be described in greater detail below, the APIs enable BC applications to provide information to and retrieve information from the BCE. Such information may include, for example, BC configuration (e.g., whether the application is enabled), application status, communication status, candidate migration destinations, necessary steps for online, necessary steps for offline, and current system requirements for the application.

FIG. 1 illustrates a BCC system 100 comprising two independent, geographically dispersed clusters 102, 102'. For purposes of example and explanation, the cluster 102 will be designated the primary cluster, while the cluster 102' will be designated the secondary cluster. It will be recognized that, while only two clusters are illustrated, additional secondary clusters may be provided. In one embodiment, the clusters 102, 102', are located at geographically separate sites. As illustrated in FIG. 1, the primary cluster 102 includes an Ethernet switch 104 for connecting a plurality of servers, or nodes, 106, to a wide area network ("WAN") 108. The servers 106 are connected to a storage area network ("SAN") 110 via a fiber channel switch 112. Similarly, the secondary cluster 102' includes an Ethernet switch 104' for connecting a plurality of servers, or nodes, 106', to the wide area network ("WAN") 108. The servers 106' are connected to the storage area network ("SAN") comprising a fiber channel 110 and multiple fiber channel disk arrays 111, 111', via a fiber channel switch 112'.

In accordance with features of one embodiment, each server 106 of the cluster 102 includes a BCE 114; similarly, each server 106' of the cluster 102' includes a BCE 114'. The BCEs 114, 114' each comprise a system that provides a means of managing and controlling BC applications. The BCEs 114, 114' communicate via a common information model ("CIM") 115.

Figure 2:
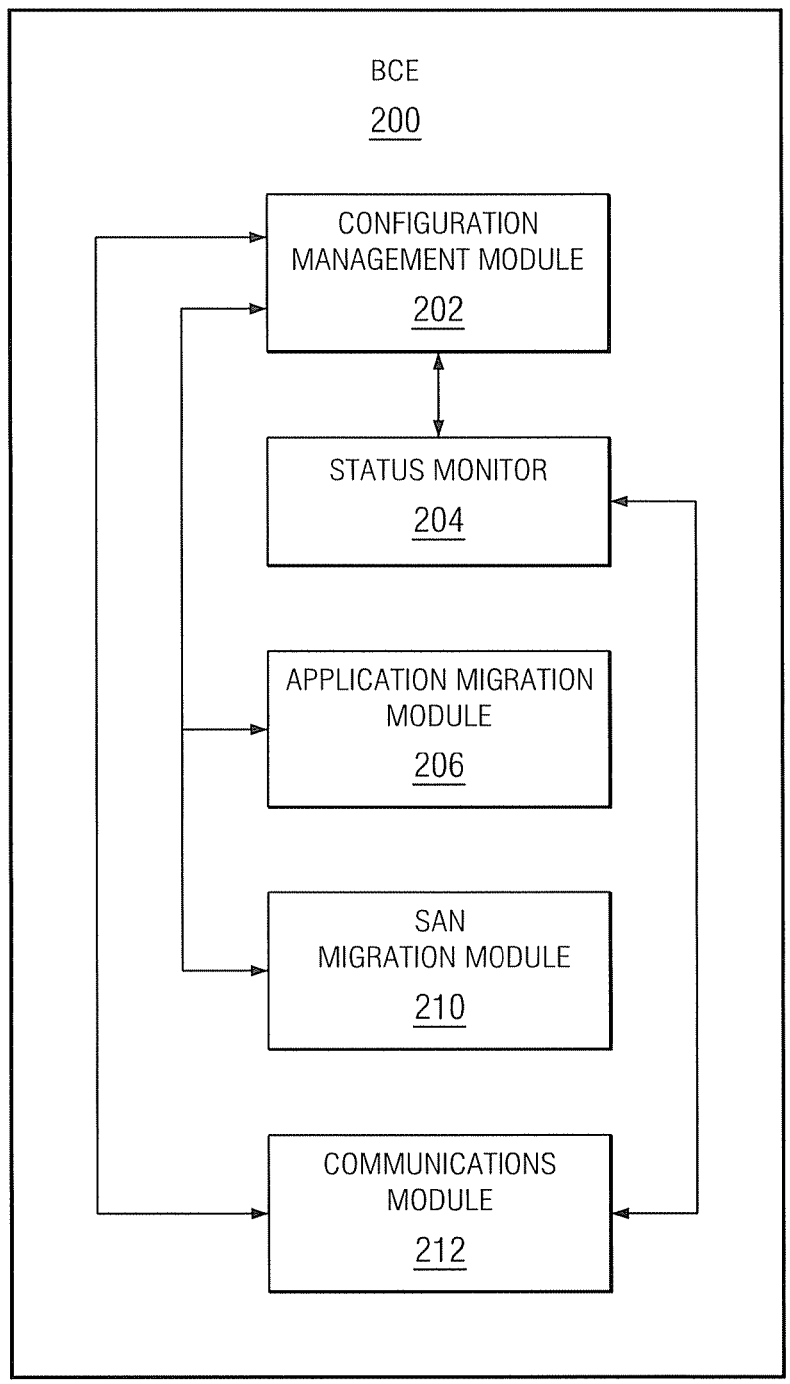
FIG. 2 is a block diagram of a business continuity engine for implementing an embodiment for dynamically enabling an application for business continuity.

FIG. 2 illustrates a block diagram of a BCE 200, which is identical to the BCEs 114, 114'. As illustrated in FIG. 2, the BCE 200 includes a configuration management module 202 for maintaining information regarding the current configuration of a BC application, a status monitor 204 for determining the status of the BC application and initiating a migration/failover to a new location if necessary, and an application migration module 206 for handling the steps necessary to migrate the BC application to a new location. The BCE 200 further includes a Storage area network ("SAN") migration module 210 for handling the steps necessary to enable the storage media at the new location so that the BC application can be loaded thereon, and a communications module 212 for handling the exchange of data between the BCE 200 and the BC application.

In particular, the configuration management module 202 interfaces with the status monitor module 204 to determine the health of the BC application and its host server. The configuration management module 202 notifies the application migration module 206 and the SAN migration module 210 that the BC application needs to be migrated. The communications module 212 interfaces with the configuration management module 202 to allow the application to set and retrieve configuration information. The communications module 212 also interfaces with the status monitor module 204 to provide internal status of the application.

Referring again to FIG. 1, in operation, a BCE is loaded onto each server 106, 106' of the primary and secondary clusters 102, 102'. Next, a BC application 120 is loaded onto a server of the primary cluster 102. The data of the BC application 120 is mirrored to the secondary cluster 102' so as to be available for use by that cluster in the event the application must be migrated thereto (as represented by a BC application 120'). The BC application 120 periodically communicates its status to the primary cluster 102 via the HA wrapper thereof. The primary and secondary clusters 102, 102', also communicate status to one another via the CIM 115. The BC application 120 and the primary and secondary clusters 102, 102', negotiate to determine the health of the BC application based on configuration provided in the configuration management module 202. Via its HA wrapper, the BC application 120 is able to retrieve information regarding the available servers 106' of the secondary cluster 102', as well as to broadcast its system requirements and current status to the BCE 114 of the server 106 on which it is installed, which information is used by the BCE to manage status, migration, and failover.

The embodiments illustrated herein leverage off of BCC in that they are tied specifically to an application in the form of an HA wrapper with a configuration that may be developed and distributed by the application vendor with the application. Additionally, customized monitoring and application status may be built into the HA wrapper, thereby enabling the monitoring to be dynamic based on the application's own awareness, as well as on external information. Still further, the HA wrapper has the ability to dynamically define the system requirements necessary for the application to be migrated at its current state so that the application is not migrated to a server on which it cannot be safely loaded. The HA wrapper may also dynamically define the steps necessary to unload it from the current cluster and then reload it on a new cluster based on information retrieved from the available clusters.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Therefore, the claims should be interpreted in a broad manner, consistent with the present disclosure.

What is claimed is:

1. A business continuity engine ("BCE") for managing and controlling high-availability applications, the BCE comprising:

a computer;

a configuration management module executing on the computer for maintaining information regarding the current configuration of a BC application executing on a first server of a primary cluster of servers, the BC application comprising a software interface that exposes a set of high-availability ("HA") APIs, said APIs enabling said BC application to provide information to and retrieve information from the BCE;

a status monitor executing on the computer for monitoring a status of the BC application via a high-availability ("HA") wrapper thereof and initiating a migration of the BC application to load the application from the first server of the primary cluster to a second server of a secondary cluster for execution thereon based on the determined status, the HA wrapper enabling the BC application to retrieve information about servers available for said migration in the secondary cluster;

an application migration module executing on the computer for loading the BC application to the second server for said execution responsive to the initiating;

a storage area network ("SAN") migration module executing on the computer for enabling storage media for use by the BC application upon being loaded to the second server; and a communications module executing on the computer for facilitating an exchange of data between the BC engine and the BC application.

2. The BCE of claim 1 wherein the BCE interacts with the BC application via said high-availability ("HA") wrapper and said APIs.

3. The BCE of claim 1, wherein the HA wrapper enables customized monitoring and application status to enable dynamic monitoring based on an awareness of the BC application.

4. The BCE of claim 1, wherein the HA wrapper enables customized monitoring and application status to enable dynamic monitoring based on information external to the BC application.

5. The BCE of claim 1, wherein the HA wrapper enables dynamic definition of system requirements necessary for loading of the BC application to the second server at a current state thereof.

6. The BCE of claim 1, wherein the HA wrapper enables dynamic definition of steps for unloading the BC application from the first server and loading it to the second server.

7. A method for managing and controlling high-availability applications in a business continuity ("BC") cluster system comprising first and second clusters, each of the clusters comprising a plurality of servers connected to a respective storage network, the method comprising:
loading a BC engine ("BCE") onto each of the servers, the BCE for managing and controlling BC applications running on one of the servers;
running a BC application on a selected one of the plurality of servers of the first cluster, the BC application including a software application and a high-availability ("HA") wrapper comprising a software interface that exposes a set of HA APIs to the software application, said APIs enabling said BC application to provide information to and retrieve information from the BCE, and the HA wrapper enabling the BC application to retrieve information about servers available for migration in the secondary cluster;
mirroring data of the BC application to another one selected server of the second cluster; and
responsive to failure of the selected one server of the first cluster, loading the BC application from the selected one server of the first cluster to said another one selected server of the second cluster using the HA APIs.

8. The method of claim 7 wherein the first and second clusters are geographically dispersed.

9. The method of claim 7 further comprising, responsive to failure of the selected one server of the first cluster, selecting said another one selected server of the second cluster using the HA APIs prior to loading the BC application to said another one selected server of the second cluster.

10. The method of claim 7 wherein the HA wrapper enables customized monitoring and application status to enable dynamic monitoring based on an awareness of the BC application.

11. The method of claim 7 wherein the HA wrapper enables customized monitoring and application status to enable dynamic monitoring based on information external to the BC application.

12. The method of claim 7 wherein the HA wrapper enables dynamic definition of system requirements necessary for migration of the BC application at a current state thereof.

13. The method of claim 7 wherein the HA wrapper enables dynamic definition of steps for unloading the BC application from the server of the first cluster and loading it to the selected server of the second cluster.

14. A system for managing and controlling high-availability applications in a business continuity ("BC") cluster network comprising first and second clusters, each of the clusters comprising a plurality of servers connected to a storage network, the system comprising:
a BC engine ("BCE") loaded onto each of the servers, the BCE for managing and controlling BC applications running on one of the servers;
a BC application executing on a selected one of the servers of the first cluster, the BC application including a software application and a high-availability ("HA") wrapper comprising a software interface that exposes a set of HA APIs to the software application, said APIs enabling said BC application to provide information to and retrieve information from the BCE, and the HA wrapper enabling the BC application to retrieve information about servers available for migration in the secondary cluster;
and
an application migration module responsive to failure of the selected one server of the first cluster for loading the BC application from the selected one of the servers of the first cluster to another selected one of the servers of the second cluster using the HA APIs; wherein the application migration module mirrors data of the BC application to the second cluster.

15. The system of claim 14 wherein the first and second clusters are geographically dispersed.

16. The system of claim 14 further comprising, responsive to failure of the selected server of the first cluster, selecting said selected one of the servers of the second cluster using the HA APIs prior to loading the BC application to said selected one of the servers of the second cluster.

17. The system of claim 14 wherein the HA wrapper enables customized monitoring and application status to enable dynamic monitoring based on an awareness of the BC application.

18. The system of claim 14 wherein the HA wrapper enables customized monitoring and application status to enable dynamic monitoring based on information external to the BC application.

19. The system of claim 14 wherein the HA wrapper enables dynamic definition of system requirements necessary for migration of the BC application at a current state thereof.

20. The system of claim 7 wherein the HA wrapper enables dynamic definition of steps for unloading the BC application from the server of the first cluster and loading it to the selected server of the second cluster.

* * * * *